United States Patent [19]

Hater et al.

[11] Patent Number: 4,810,385

[45] Date of Patent: Mar. 7, 1989

[54] DEVICE FOR SEEDING BACTERIAL CULTURES TO SYSTEMS TO ASSIST IN BIODEGRADING WASTE

[75] Inventors: Gary R. Hater, Cincinnati, Ohio; Mark J. Krupka, Tabernacle, N.J.; Lois T. Davis, Salem, Va.

[73] Assignee: Sybron Chemicals, Inc., Birmingham, N.J.

[21] Appl. No.: 48,819

[22] Filed: May 12, 1987

[51] Int. Cl.⁴ ............................ C02F 3/34; C02F 3/06
[52] U.S. Cl. ..................................... 210/606; 210/610; 210/611; 210/615; 210/150
[58] Field of Search .............. 435/292, 293, 294, 262; 210/150, 151, 602, 615, 632, 601, 606, 629, 610, 611

[56] References Cited

U.S. PATENT DOCUMENTS

| | | | |
|---|---|---|---|
| 3,242,055 | 3/1966 | Lucia | 210/606 |
| 3,506,582 | 4/1970 | Gertzman | 210/632 |
| 3,580,840 | 5/1971 | Uridil | 210/629 |
| 4,005,010 | 1/1977 | Lunt | 210/615 |
| 4,077,877 | 3/1978 | Orensten et al. | 210/615 |
| 4,670,149 | 6/1987 | Francis | 210/150 |
| 4,678,567 | 7/1987 | Ueda | 210/150 |

FOREIGN PATENT DOCUMENTS

| | | | |
|---|---|---|---|
| 57-71695 | 5/1982 | Japan | 210/601 |
| 60-71089 | 4/1985 | Japan | 210/601 |

Primary Examiner—Benoit Castel
Attorney, Agent, or Firm—Marjama & Pincelli

[57] ABSTRACT

A device suitable for seeding bacterial cultures to waste flowing through or which has accumulated in a collection system which comprises a porous outer covering member which forms an enclosed package with a source of bacterial cultures contained within said package, said cultures suitable for seeding a collection system as a waste stream flows through the porous covering member of said enclosed package causing the bacteria to be released into said waste stream.

13 Claims, 1 Drawing Sheet

DEVICE FOR SEEDING BACTERIAL CULTURES TO SYSTEMS TO ASSIST IN BIODEGRADING WASTE

BACKGROUND OF THE INVENTION

Prior art methods and systems for biological control of oil and grease buildup in collection lines had not yielded satisfactory results. The standard procedures of rehydrating bacteria and dosing various points in a collection system on an intermittent basis does not seem to provide the bacteria with an adequate residence time to function in or colonize the walls of collection line pipes. Automatic methods of providing a continuous seed of bacteria to a collection system are somewhat effective, but are expensive because capital equipment costs are high for numerous installations, and such systems are extremely labor intensive because batteries for the samplers (most manholes do not have electrical utilities) have to be replaced every day.

There is, therefore, a continuing need for a delivery system and device that is simple, reliable, inexpensive, non labor intensive, and effective.

SUMMARY OF THE INVENTION

The system and device of the present invention consists of a package or sock which is fabricated from a porous material, and which is filled with dried bacterial cultures or microorganisms which are suitable for degrading waste. In use, the sock is immersed in a waste stream and as sewage flows through the porous sock the dried bacteria are wetted and released into the stream to act on sewage, oil, grease, $H_2S$, and other organics present in a typical municipal collection system. In addition to the bacterial culture, the sock may optionally also contain additive materials which function to stimulate growth of the bacteria and enzyme production. The sock may also be enclosed in a protective outer casing which is provided with openings to allow the waste stream to directly contact the sock. Alternatively the device may comprise a solid enclosed outer casing which contains the cultures. In this embodiment the casing would contain one or more openings to allow the bacteria to be released into the waste stream.

DETAILED DESCRIPTION OF THE INVENTION

Figure 1:
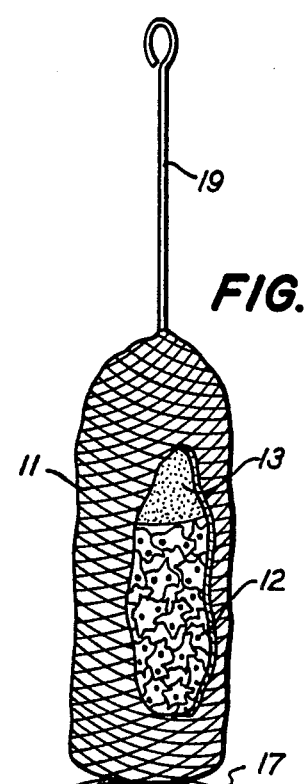
FIG. 1 is a cut-away exploded view of one embodiment of a device of the present invention.

As illustrated in FIG. 1 of the drawings, the package or sock 11 is preferrably fabricated from a coarse, porous material such as burlap, canvas or other suitable fabric. It is also contemplated that other materials such as a microscreen plastic or a porous metal screen could also be used. The sock is filled with a suitable dried bacterial culture 12 which is contained on a carrier 12A and is effective in degrading the waste or other problematic compounds in a selected collection system. The sock may optionally contain additives 13 such as chemical salts (such as nitrogen or phosphorous), buffers, surfactants, enzymes or organic substrates which function to stimulate the growth of the bacteria and enzyme production within the sock and immediately after their release from the sock. Optional buffers such as sodium bicarbonate or a monosodium or disodium phosphate may be used in amounts from about 0 to 40% by weight.

Suitable bacterial cultures are available from Sybron Chemicals Inc. (Biochemical) Salem, Va. under the trademarks BI-CHEM®DC 2000GL, and BI-CHEM®2001 LN. BI-CHEM 2000GL contains 3 strains of *Bacillus subtilis*, 3 strains of *Pseudomonas aeruginosa*, 1 strain of *Pseudomonas stutzeri*, 1 strain of *Pseudomonas putida*, and 1 strain of *Escherichia hermanii* grown on a bran base. Additives include dry non-ionic surfactant* in a concentration by weight of about 15–25%; crude enzyme**, i.e., Crude Lipase in a concentration by weight of about 0.5–3% BI-CHEM 2001 LN contains 3 strains of *Bacillus subtilis*, 3 strains of *Pseudomonas aeruginosa*, 1 strain of *Pseudomonas stutzeri*, and 1 strain of *Escherichia hermanii* on a bran base. Other suitable cultures which may be used with the present invention fall into the genus classification of Arthrobacter, Achromobacter, Flavobacterium and Bdellovibrio.

*Available from Rohm & Haas of Philadelphia, Pa. under the tradename Triton X-120.
**Available from Scientific Protien of Waunakee, Wis. under the tradename Lipase 3000.

The sock generally contains about 1 to 25 pounds of total cultures and additives depending upon the application or use. Most uses involve a sock containing about 1 to 5 pounds of materials. In general the sock may take any suitable form. A typical sock can be cylindrical in shape and range from about 4 to 6 inches in diameter and 10 to 18 inches in length. For certain applications requiring large amounts of seeding to the waste stream, the sock may take other forms such as a 50 pound bran bag. In general the additives constitute about 0 to 50 percent by weight of the total materials contained in the sock with the balance of the materials constituting the cultures contained on a carrier material. The cultures are usually contained on a solid carrier such as bran base, rice hulls or peanut hulls.

The sock 11 of the present invention may also be contained in an outer housing or casing 14 which optionally may provide a means for securing a fastening member 15 such as a grommet. The purpose of the casing is to keep the sock intact and protect the sock from any physical damage which could result from the sewage flow stream. The casing should be constructed to allow the sewage liquid to contact and wet the sock to enable the bacteria to be released from the surface of the solid carrier and provide the collection system with a continuous seed of bacteria from the sock. To accomplish this the casing may be provided with holes or slots to allow the sewage water to pass through its sides and/or ends. For purposes of illustration a plurality of slots 16 are provided to accomplish this purpose.

The ends 17 and 18 of the casing may be completely closed or partially open or slotted to provide for additional waste water flow as long as they function to keep the sock in place within the casing.

A chain or cord 19 may be attached to sock or the casing to secure the device in a preferred location in the sewage stream.

Figure 2:
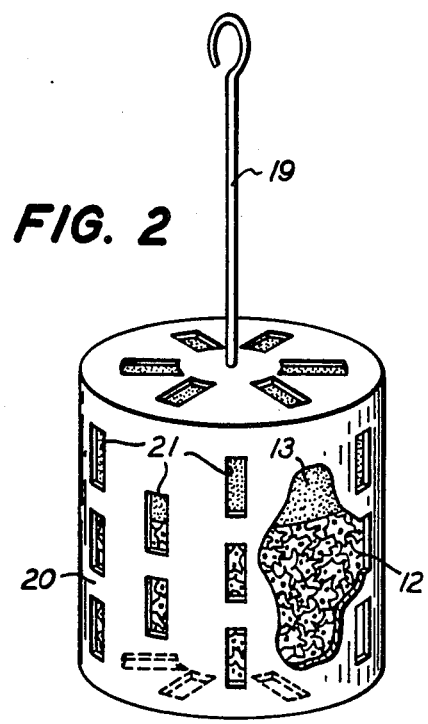
FIG. 2 is a cut-away view of a second embodiment of a device of the present invention.

In another embodiment, illustrated in FIG. 2, a solid container, such as a molded plastic may be used in place of the porous package. In this embodiment, the cultures or microorganisms, and optional additives, are contained in the sealed container 20, such as a molded plastic, which contains a plurality of openings 21 to allow the bacteria to continuously seed the waste flow stream. This embodiment has a preferred use for seeding bacterial cultures into the liquid phase in a grease trap such as those used in restaurants.

In a typical operation the installation of the sock or container involves attaching it to the bottom step or other suitable appendage of the manhole or in the wet well of a pumping station and immersing it in the sewage flowing through the colection system. As the sewage flows through the porous material of the sock, it wets the dried bacteria which are then released from the surface of the solid carrier, providing the collection system with a continuous seed of the bacteria from the sock. At the same time, any chemical additives contained in the sock will also be dissolved and fed to the collection system.

Figure 3:
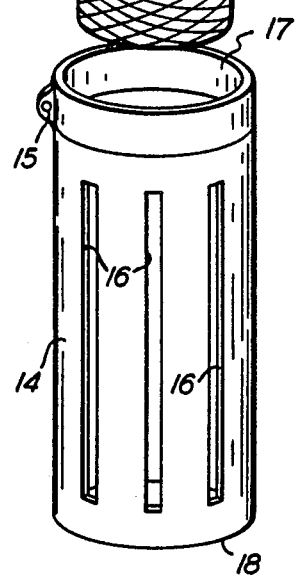
FIG. 3 is a partial sectional view of a device of the present invention illustrating sewage flow through the device.
Figure 3:
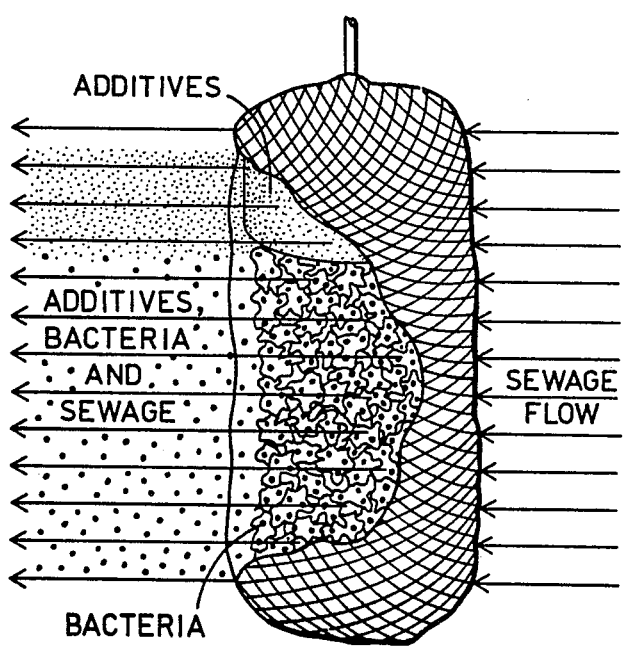

FIG. 3 schematically illustrates sewage flow through and seeding of a sewage stream by a device of the present invention. As shown, the flow of sewage through the device results in the release of bacteria or microorganisms from the device and provides a continuous seed or addition of bacterial cultures to the system.

The bacteria contained within the sock or container of the present invention may possess some or all of the following metabolic capabilities:

1. The ability to liquify and digest oils and greases of animal or vegetable origin.
2. The ability to oxidize $H_2S$ to form dilute $H_2SO_4$ or $SO_4$ salts, thereby reducing or eliminating odors associated with high $H_2S$ levels.
3. The ability to oxidize organics which can cause odor problems as well as contribute BOD to the receiving treatment plant, thereby reducing the loading on the plant.
4. The ability to oxidize petroleum hydrocarbons from ground water in an above ground chemostat or bioreactor.

In addition to the applications for treatment of collection systems, the sock may also be used in the treatment of soil and/or groundwater. In this capacity it would be packed with the appropriate bacteria for breaking down the organic contaminants in the groundwater. The sock can also be used in the bioreactor or bacteria make up tank (aerated tank).

While the invention has been described in detail with respect to specific embodiments thereof, it will be understood by those skilled in the art that variations and modifications may be made without departing from the essential features thereof.

What is claimed is:

1. A device suitable for seeding bacterial cultures to waste flowing through or which has accumulated in a collection system which comprises:
   (a) a porous fabric outer covering member which forms an enclosed package, and
   (b) a source of dried bacterial cultures contained on a carrier and confined within said package, said cultures suitable for seeding a collection system as a waste stream flows through the porous covering member of said enclosed package causing the bacteria to be released into said waste stream, and
   (c) said package further containing at least one material selected from the group consisting of nitrogen salts, phosphorus salts, organic substrate, buffers, enzymes and surfactants.

2. The device of claim 1 in which the package is enclosed in a protective outer casing which includes means to allow the waste stream to directly contact said package.

3. The device of claim 1 further includes means for fastening the device at a selected location within a waste stream.

4. The device of claim 1 in which the bacterial cultures comprise at least one species of Bacillus, Pseudomonas, Escherichia, Arthrobacter, Achromobacter, Flavobacterium or Bdellovibrio and mixtures thereof.

5. A device suitable for seeding bacterial cultures to waste flowing through or which has accumulated in a collection system which comprises:
   (a) a porous fabric outer covering member which forms an enclosed package, and
   (b) a source of dried bacterial cultures contained on a carrier and confined within said package with said carrier consisting of at least one material selected from the group consisting of bran base, rice hulls and peanut hulls, said cultures suitable for seeding a collection system as a waste stream flows through the porous covering member of said enclosed package causing the bacteria to be released into said waste stream.

6. The device of claim 5 in which the package is enclosed in a protective outer casing which includes means to allow the waste stream to directly contact said package.

7. The device of claim 5 in which the package further contains at least one of the following: nitrogen salts, phosphorus salts, organic substrate, buffers, enzymes and surfactants.

8. The device of claim 5 further includes means for fastening the device at a selected location within a waste stream.

9. The device of claim 5 in which the bacterial cultures comprise at least one species of Bacillus, Pseudomonas, Escherichia, Arthrobacter, Achromobacter, Flavobacterium or Bdellovibrio and mixtures thereof.

10. A method for biodegrading waste flowing through or which has accumulated in a collection system, grease trap, chemostat or bioreactor which comprises:
    (a) providing a porous fabric outer covering member which forms an enclosed package, and which contains a source of dried bacterial cultures contained on a carrier and confined within said package, said cultures suitable for seeding a collection system as a waste stream flows through the porous covering member of said enclosed package causing the bacteria to be released into said waste stream, said package further containing at least one material selected from the group consisting of nitrogen salts, phosphorus salts, organic substrate, buffers, enzymes and surfactants,
    (b) placing said package within a waste stream whereby said package seeds said stream with biodegrading cultures.

11. The device of claim 10 in which the package is enclosed in a protective outer casing which includes means to allow the waste stream to directly contact said package.

12. A method for biodegrading waste flowing through or which has accumulated in a collection system, grease trap, chemostat or bioreactor which comprises:

(a) providing a porous fabric outer covering member which forms an enclosed package, and which contains a source of dried bacterial cultures contained on a carrier and confined within said package, with said carrier consisting of at least one material selected from the group consisting of bran base, rice hulls and peanut hulls, said cultures being suitable for seeding a collection system as a waste stream flows through the porous covering member of said enclosed package causing the bacteria to be released into said waste stream, (b) placing said package within a waste stream whereby said package seeds said stream with biodegrading cultures.

13. The device of claim 12 in which the package is enclosed in a protective outer casing which includes means to allow the waste stream to directly contact said package.

* * * * *